United States Patent
Vella et al.

(10) Patent No.: US 10,422,699 B1
(45) Date of Patent: Sep. 24, 2019

(54) PLASMONIC SELECTIVE PYROELECTRIC DETECTION FOR LASER WARNING

(71) Applicant: Government of the United States, as represented by the Secretary of the Air Force, Wright-Patterson AFB, OH (US)

(72) Inventors: Jarrett H. Vella, New Carlisle, OH (US); Joshua Hendrickson, Dayton, OH (US); Justin W. Cleary, Miamisburg, OH (US); Shivashankar R. Vangala, Mason, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/106,368

(22) Filed: Aug. 21, 2018

Related U.S. Application Data (60) Provisional application No. 62/656,431, filed on Apr. 12, 2018.

(51) Int. Cl.
  *G01J 5/34* (2006.01)
  *G01J 5/06* (2006.01)
  *G01J 5/04* (2006.01)

(52) U.S. Cl.
  CPC ............ *G01J 5/34* (2013.01); *G01J 5/046* (2013.01); *G01J 5/061* (2013.01)

(58) Field of Classification Search
  CPC .......... H01L 31/00; G01N 5/34; G01N 5/046; G01N 5/061
  See application file for complete search history.

(56) References Cited

U.S. PATENT DOCUMENTS

| 7,683,310 B1 | 3/2010 | Sinclair et al. |
| 8,462,420 B2 | 6/2013 | Lee et al. |

(Continued)

OTHER PUBLICATIONS

Goldsmith et al., "Long-wave infrared selective pyroelectric detector using plasmonic near-perfect absorbers and highly oriented aluminum nitride," Journal of the Optical Society of America B: Optical Physics, vol. 34, No. 9, pp. 1965-1970, published Aug. 22, 2017. (Year: 2017).*

(Continued)

*Primary Examiner* — Yara B Green
(74) *Attorney, Agent, or Firm* — AFMCLO/JAZ; Jeffrey Moore (57) ABSTRACT

A hybrid plasmonic-pyroelectric detector and laser detection system is disclosed. The hybrid plasmonic-pyroelectric detector includes a substrate and a refractory ground plane mounted on a surface of the substrate. A plasmonic array defines a plurality of apertures formed in the array. A highly-oriented pyroelectric layer is mounted on a surface of the ground plane and a surface of the plasmonic array. The plasmonic array is constructed and arranged to select particular wavelengths. Alternatively, a semiconductor or an avalanche material may be used. A pair of electrode contacts are coupled to each of the plasmonic array and the refractory ground plane. A laser detection system in accordance with the disclosure includes a mechanical chopper, a lens, a folding mirror, and a chip carrier for mounting the hybrid plasmonic-pyroelectric detector.

23 Claims, 6 Drawing Sheets

(56) References Cited

U.S. PATENT DOCUMENTS

| | | |
|---|---|---|
| 9,297,638 B1 | 3/2016 | Dyer et al. |
| 9,329,339 B2 | 5/2016 | Bai et al. |
| 9,645,075 B2 | 5/2017 | Choi |
| 2006/0050270 A1* | 3/2006 | Elman .................. G01N 21/359 356/326 |
| 2008/0002192 A1 | 1/2008 | David |
| 2009/0025120 A1* | 1/2009 | Vestling ............... A41D 19/015 2/161.1 |
| 2012/0286161 A1* | 11/2012 | Raieszadeh ............... G01J 5/06 250/338.3 |
| 2013/0323305 A1* | 12/2013 | Paithankar ......... A61K 41/0057 424/489 |
| 2014/0103211 A1* | 4/2014 | Darcie ................ H01L 31/0224 250/338.4 |
| 2014/0175546 A1* | 6/2014 | Huffaker ......... H01L 31/022425 257/342 |
| 2015/0098002 A1* | 4/2015 | Wang ..................... G02B 13/18 348/333.11 |
| 2015/0221796 A1* | 8/2015 | Smith ................ H01L 31/0352 257/440 |
| 2015/0369668 A1* | 12/2015 | Watabe .................. H01L 37/02 250/338.3 |
| 2017/0191874 A1* | 7/2017 | Suzuki ................. G01J 5/0235 |

OTHER PUBLICATIONS

T. D. Dao, S. Ishii, T. Yokoyama, T. Sawada, R. P. Sugavaneshwar, K. Chen, Y. Wada, T. Nabatame, and T. Nagao, "Hole array perfect absorbers for spectrally selective midwavelength infrared pyroelectric detectors," ACS Photon. 3, 1271-1278 (2016).

Chirtoc, Mihai & Bentefour, El Hassane & Antoniow, Jean-Stéphane & Glorieux, Christ & Thoen, J & Delenclos, S & Sahraoui, A.H. & Longuemart, S & Kolinsky, Corinne & Buisine, J.M.. (2003). Current mode versus voltage mode measurement of signals from pyroelectric sensors. Review of Scientific Instruments. 74. 648-650.

Eugenia Mirica, Glen Kowach, Paul Evans, and,Henry Du, "Morphological Evolution of ZnO Thin Films Deposited by Reactive Sputtering," Crystal Growth & Design 2004 4 (1), 147-156.

* cited by examiner

PLASMONIC SELECTIVE PYROELECTRIC DETECTION FOR LASER WARNING

CROSS-REFERENCE TO RELATED APPLICATION(S)

The present application claims the benefit of U.S. Provisional Application No. 62/656,431, filed Apr. 12, 2018, the contents of which are hereby incorporated by reference.

STATEMENT OF GOVERNMENT INTEREST

The invention described herein may be manufactured, used, and licensed by or for the Government of the United States for all governmental purposes without the payment of any royalty.

BACKGROUND

Contemporary pyroelectric detectors generally function by using heat to generate an electric voltage in a material. The material is deemed pyroelectric when a change in temperature alters its spontaneous polarization, causing a change in electric voltage across the material to develop. An optical absorber proximate the pyroelectric material converts incident radiation into heat; the absorption spectrum of the optical absorber generally determines the wavelength response the detector and generally covers at least 1000 nm of optical bandwidth. When the electric voltage across the material is directly measured, it is generally called a "voltage-mode" pyroelectric detector. When the current driven in the detector by the change in voltage is measured, it is generally called a "current-mode" pyroelectric detector. Current-mode pyroelectric detection is considered to be superior to voltage-mode because it minimizes electromagnetic interference and stray detector capacitance. See, M. Chirtoc, E. H. Bentefour, J. S. Antoniow, C. Glorieux, J. Thoen, S. Delenclos, A. H. Sahraoui, S. Longuemart, C. Kolinsky and J. M. Buisine, "Current Mode Versus Voltage Mode Measurement of Signals from Pyroelectric Sensors," Rev. Sci. Inst. 74, 648-650 (2003) ("Cirtoc, et al.").

In one instantiation of the current art shown in D. Dao, S. Ishii, T. Yokoyama, T. Sawada, R. P. Sugavaneshwar, K. Chen, Y. Wada, T. Nabatame and T. Nagao, "Hole Array Perfect Absorbers for Spectrally Selective Midwavelength Infrared Pyroelectric Detectors," ACS Photonics 3, 1271-1278 (2016)(Ishii, et al.), a plasmonic perfect absorber was incorporated with a pyroelectric material to fabricate a detector that selectively detects wavelengths of $\lambda=3.88$ μm and 5.50 μm. A plasmonic perfect absorber is generally a sub-wavelength patterned structure designed to match the impedance of radiation in air to the impedance of the radiation in the patterned structure. The condition of matched impedances causes minimal reflection and maximum absorption in the structure. Incident radiation with wavelengths that do not satisfy the impedance matching condition are generally reflected. Ishii, et al. states that the detector "can be used for various applications such as temperature sensing, IR color imaging, NDIR [Non-Dispersive InfraRed] spectroscopy, and IR material sensors." This detector is operated in voltage mode.

In the referenced instantiation, an array of 1.8 μm diameter apertures with a period of 3.0 μm were fabricated in gold using colloidal mask lithography. Underneath the array of holes in gold was an oriented zinc oxide (ZnO) layer 680 nm thick. Underneath the ZnO layer was a platinum (Pt) electrode and a silicon (Si) substrate. The ZnO layer was grown in such a way that the measure of crystallinity (X-Ray diffraction full width at half maximum) was 1.37° (see, Mirica, E., G. Kowach, P. Evans, and H. Du, "Morphological Evolution of ZnO Thin Films Deposited by Reactive Sputtering," Cryst. Growth and Design 4, 147-156 (2004)). Crystallinity is measured using x-ray diffraction; the closer the measure of crystallinity is to 0.00°, the more crystalline ("highly oriented") a material becomes.

Pyroelectric detectors are commonly used to detect and characterize laser radiation, such as the Pyrocam IV manufactured by Ophir Optronics. These detectors do not selectively detect one laser wavelength and generally have very low laser induced damage thresholds. In the specific case of the Pyrocam IV, it is sensitive from the X-Ray region to the THz region. Detectors such as photoconductors as taught by U.S. Pat. No. 7,683,310 to Sinclair, et al. and U.S. Patent Application Publication No. 2008/0002192 by David, are operable to detect both scattered and direct laser radiation and can be cooled or uncooled depending on the required detector sensitivity.

There are several drawbacks to the current art. While the pyroelectric ZnO as disclosed by Ishii, et al. shows a degree of crystalline orientation, processes of reactive sputtering, such as utilized to produce ZnO, are capable of producing films having a significantly higher crystalline orientation, and the degree of crystalline orientation has a direct effect on the sensitivity of a pyroelectric detector. The higher the crystallinity of the pyroelectric material (i.e., the more highly oriented pyroelectric material), the more sensitive the detector. Commercially available laser detectors generally cannot survive irradiation from excessively high energy sources and therefore require external protection such as sacrificial optical limiters to protect them from damage. Furthermore, they generally lack the ability to selectively detect individual laser lines without external filter wheels.

Accordingly, there is a need in the art for a detector capable of detecting specific laser wavelengths that does not require external protective devices or external filter wheels.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Specific embodiments of the disclosure will now be described in detail with reference to the accompanying figures. While this disclosure is susceptible of being embodied in many different forms, there is shown in the drawings and will herein be described in detail specific embodiments, with the understanding that the present disclosure is to be considered as an example of the principles of the disclosure and not intended to limit the disclosure to the specific embodiments shown and described. In the description below, like reference numerals may be used to describe the same, similar or corresponding parts in the several views of the drawings.

All documents mentioned herein are hereby incorporated by reference in their entirety. References to items in the singular should be understood to include items in the plural, and vice versa, unless explicitly stated otherwise or clear from the text.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In view of the above and in accordance with an embodiment of the disclosure, there is provided a hybrid plasmonic-pyroelectric detector. Advantageously, the detector includes a substrate, a refractory ground plane mounted on a surface of the substrate, a plasmonic array having a plurality of apertures formed in the array, a highly oriented pyroelectric layer having a first side mounted on a surface of the ground plane and a second side mounted on a surface of the plasmonic array, and electrode contacts coupled to the refractory ground plane and the plasmonic array.

In accordance with another embodiment, the substrate consists of sapphire, the refractory ground plane consists of titanium nitride, the pyroelectric layer consists of aluminum nitride, and the plasmonic array includes a gold layer and the plurality of apertures in the array are formed in the gold.

In accordance with a further embodiment, the plasmonic array is an ordered array or a disordered array of apertures, and standalone plasmonic particles consisting of one of nanospheres, squares, trapezoids, and one of regular and irregular polygons.

In accordance with another embodiment, the detector is fabricated on one side of a back-thinned wafer or a thermally isolated wafer.

In accordance with yet another embodiment, the detector further includes a cooling apparatus. The cooling apparatus can be a sterling, Joule-Thompson, single stage thermoelectric, multiple stage thermoelectric, or cryogenic apparatus.

In accordance with still another embodiment, the substrate consists of one of sapphire, silicon, glass, fused silica, quartz, silicon carbide, indium phosphide and gallium arsenide.

In accordance with another embodiment, the refractory material consists of one of chrome, titanium, tungsten, titanium-tungsten, gold or molybdenum.

In accordance with still another embodiment, the pyroelectric material consists of one of lead-zirconium-titanate, lead tantalate, aluminum nitride, tourmaline, gallium nitride and polyvinyl fluoride.

In accordance with a further embodiment, a plurality of the hybrid plasmonic-pyroelectric detectors are constructed and arranged into an ordered or a disordered array. In this expedient, each detector is configured to sense a different wavelength.

In accordance with other embodiments, there is provided a hybrid plasmonic pyroelectric detector having a semiconductor or an avalanche material mounted on a surface of the plasmonic array.

In accordance with still further embodiments, there is provided a laser detection system, which includes a mechanical chopper, a lens, a folding mirror, and a chip carrier having a hybrid plasmonic-pyroelectric detector as described above mounted thereon. In an illustrative embodiment, the lens is a biconvex zinc selenide lens. The chip carrier can be mounted to a printed circuit board, and the printed circuit board mounted to a translation stage and electrically coupled to a current pre-amplifier and lock-in amplifier.

Figure 1A:
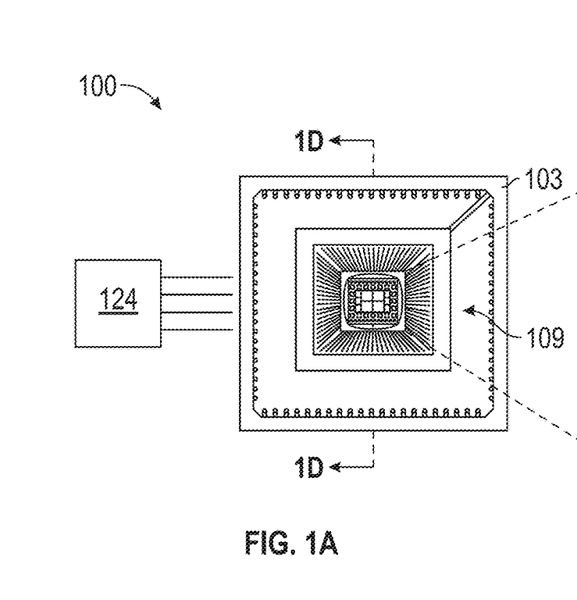
FIGS. 1A, 1B and 1C are top view depictions of a hybrid-plasmonic pyroelectric detector in accordance with an embodiment of the present disclosure.

With reference to FIGS. 1A, 1B, 1C and 1D, there are illustrated top views and sectional views, respectively, of a hybrid plasmonic-pyroelectric detector 100 in accordance with an embodiment of the present disclosure. The detector assembly 100 includes a detector chip 109 that is bonded to a chip carrier 103 using a conductive paste as shown in FIG. 1A. As can be seen in the section view of FIG. 1D, the detector chip 109 consists of a crystalline substrate 102 and a refractory ground plane 104 mounted on a surface 106 of the substrate. The substrate 102 is not necessarily transparent to the wavelength of interest. The refractory ground plane 104 is lattice-matched to the substrate 102. As will be understood by those skilled in the art, "lattice matching" refers to the spacing between atoms within each layer of material. The lattice constant for each material should be matched as close as possible within the limits of the material. In an example embodiment, a crystalline substrate was grown at 840° C., where an optimal range is approximately 400° C.- 1800° C. The substrate 102 can consist of a material including, for example, sapphire, silicon, glass, fused silica, quartz, silicon carbide, indium phosphide or gallium arsenide. The refractory ground plane 104 can consist of a material such as, for example, titanium nitride, chrome, titanium, tungsten, titanium-tungsten, gold or molybdenum.

A metallic plasmonic array 108 includes a plurality of apertures that are formed in the plasmonic array 108 and functions as a top electrode. The plasmonic array 108 may consist of a gold layer with the plurality of apertures 108 formed in the gold layer. The plasmonic array 108 may be configured as either an ordered array or a disordered array of apertures. An "ordered array" encompasses a regular pattern of apertures having like spacing and/or size. A "disordered array" is defined as apertures disposed in an irregular or random pattern of apertures and/or sizes thereof. In another embodiment, the array may consist of standalone plasmonic particles consisting of one of nanospheres, squares, trapezoids, and one of regular and irregular polygons that are deposited in the gold layer. The pyroelectric material can consist of lead-zirconium-titanate, lead tantalate, aluminum nitride (shown in the figures), tourmaline, gallium nitride or polyvinyl fluoride. Each plasmonic structure may be constructed and arranged to select a wavelength of interest by using a specific pixel size having a plurality of apertures (or standalone plasmonic particles) as described further below.

Thickness of the pyroelectric material, spacing of the apertures and their diameter determines wavelength These materials provide a detector output when the plasmonic perfect absorber excitation decays, thereby generating heat.

Figure 1B:
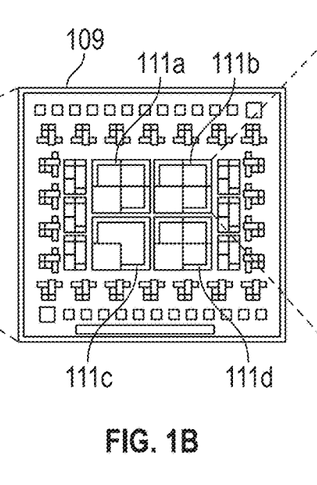
Figure 1C:
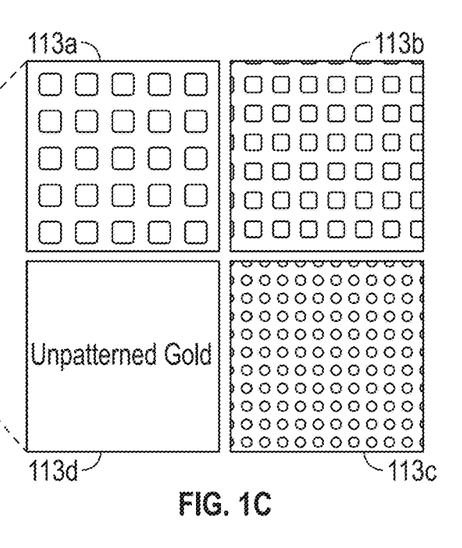
Figure 1D:
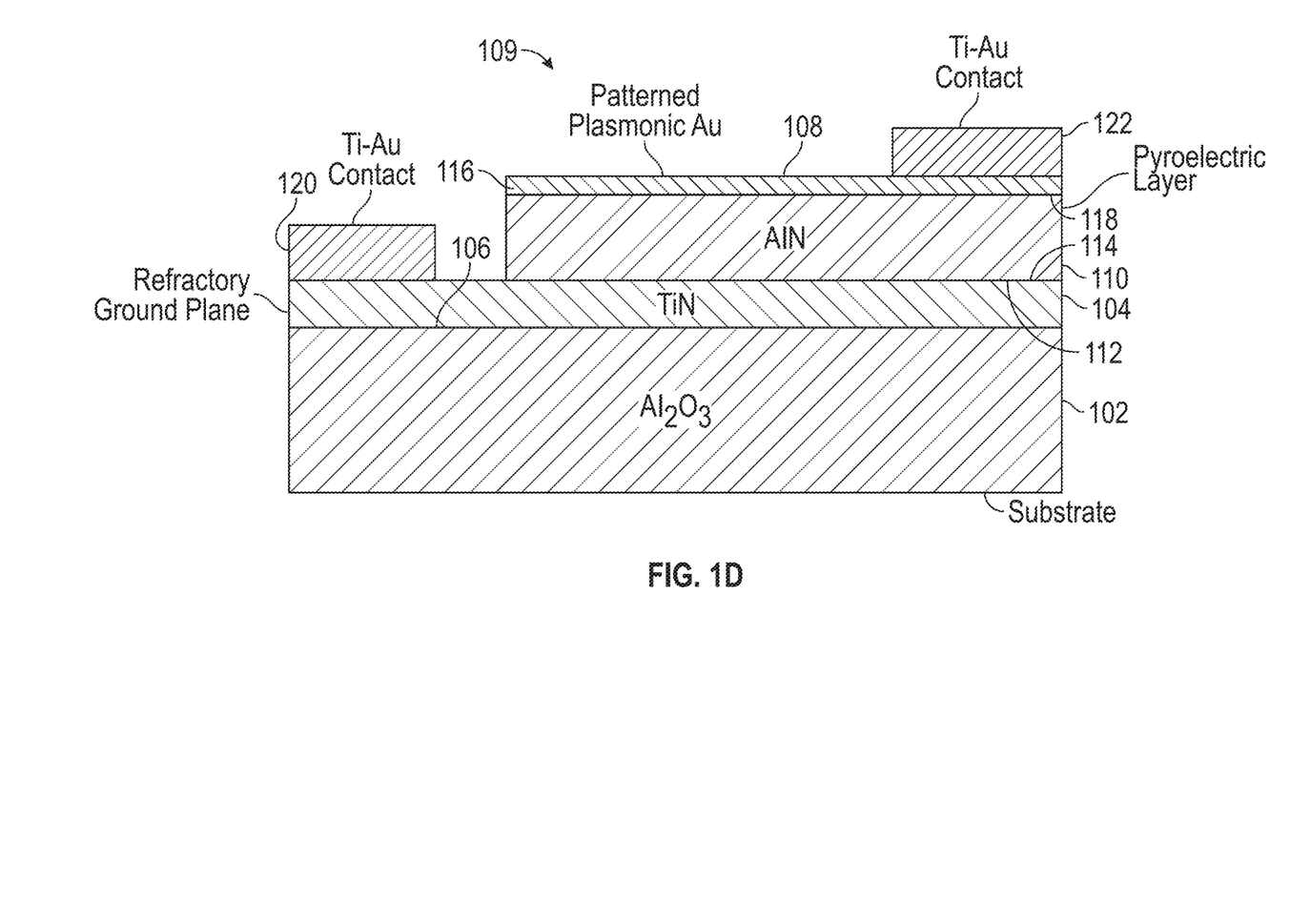
FIG. 1D is a sectional view of the detector of FIGS. 1A-1C.

In one embodiment, a highly oriented thin-film pyroelectric layer 110 has a first side thereof 112 mounted on a surface 114 of the ground plane 104 and a second side 116 mounted on a surface 118 of the plasmonic array 108. "Highly oriented" means a measure of crystallinity as close as possible to 0.00°. The pyroelectric material is lattice-matched to the substrate 102 as described above. A first electrode contact 120 is electrically coupled to the refractory ground plane 104 and a second electrode contact 122 is electrically coupled to the plasmonic array 108. The pyroelectric layer 110 is fabricated from a material that forms a dielectric layer separating the metallic plasmonic array 108 of apertures from a refractory metal. Such a pyroelectric material may include, for example, lead-zirconium-titanate, lead tantalate, aluminum nitride, tourmaline, gallium nitride or polyvinyl fluoride. This configuration enables infrared radiation that is incident on the plasmonic array 108 to form a gap plasmon mode having an electric field confined to the pyroelectric layer 110. The detector 100 can be fabricated on one side of a back-thinned wafer or a thermally isolated wafer. Infrared radiation incident on the array 108 forms a gap plasmon mode having an electric field confined to the pyroelectric layer 110. In another embodiment a semiconductor or an avalanche material is utilized in lieu of the pyroelectric material, and the same is mounted on the surface of the ground plane 104 and a second side mounted on a surface of the plasmonic array 108. These alternative pyroelectric materials can be substituted for aluminium nitride (AlN), and include lead-zirconium-titanate, barium strontium titanate, and lithium tantalate, among others. In the case of a semiconductor, the plasmonic excitation itself can be measured before it decays. Such semiconductor materials include indium antimonide, mercury-cadmium-telluride, indium gallium arsenide, lead sulfide, and silicon-based CMOS and CCD elements. Additionally, appropriately sized avalanche photodiode structures and reverse-biased photodides can be incorporated as the detector material.

Relaxation of the mode heats the pyroelectric (semiconductor, or avalanche material) layer, thereby producing a pyroelectric voltage. Sensing the change voltage enables incident light power to be measured. This may be accomplished at selective wavelengths. In one embodiment, a plurality of the hybrid plasmonic-pyroelectric detectors 100 can be constructed and arranged into an ordered or a disordered array, with each detector 100 configured to sense a different wavelength based on the parameters of the apertures, spacing thereof and material thickness as described above. As will be appreciated by those skilled in the art of plasmonics, numerical computational simulations are utilized to make these determinations.

The detector chip 109 can be fabricated by first depositing an electrically conductive and optically thick refractory metal film directly onto the substrate 102, followed by the thin-film pyroelectric layer 110. A metallic layer is then deposited to form the plasmonic array 108 to form the plurality of apertures 109 in the plasmonic array 108. Subsequently, the first electrode contact 120 and second electrode contact 122 are joined to the refractory ground plane 104 and the plasmonic array 108. Specifically, in accordance with an embodiment of the disclosure, the detector 100 is fabricated using a combination of contact photolithography and high temperature, reactive sputtering. A sapphire ($Al_2O_3$) wafer of lattice constant 4.76 Å is heated to 840° C. Titanium nitride (TiN) is then sputtered in a nitrogen/argon atmosphere onto the sapphire, forming nearly lattice-matched TiN, with a lattice constant of 4.26. Aluminum nitride (AlN) is reactively sputtered in a similar manner with a lattice constant of 3.11. After utilizing contact photolithography and wet etching to fabricate each pixel, a standard metal liftoff process is used to fabricate an array of 3.8 µm wide, 5.8 µm period plasmonic apertures in a gold layer. In the example embodiment, the detector chip 109 contains four groups of pixels called a "super-pixel." As shown in FIG. 1B, there is depicted an enlarged view of an optical microscope image of the detector chip 109 where these super-pixels are represented by the reference numerals 111a, 111b, 111c and 111d. These pixels feature 500 µm edge lengths. The edge lengths of the pixels toward to the edges of the image in FIG. 1B decrease to 250 µm, 125 µm and 62.5 µm, respectively. Each super-pixel is composed of four smaller pixels as shown in FIG. 1C, which is a scanning electron microscope (SEM) image of individual pixels 113a, 113b, 113c and 113d that comprise each group. Each pixel contains a plurality of apertures 115a, 115b and 115c and detects a single wavelength. In the embodiment illustrated in FIG. 1C, three different wavelengths can be detected in a single super-pixel. Hence, there are shown a plurality of detectors elements configured for detecting different wavelengths. Pixel 113d is illustrated as un-patterned, and thus operates as a non-wavelength selective reference detector. Advantageously, standard contact photolithography using conventional mask aligners can be used. This method is known in the art and commonly used to fabricate standard electronic components.

In accordance with a further embodiment, a cooling apparatus 124 can be provided to dissipate heat. The cooling apparatus may be a sterling, Joule-Thompson, single-stage thermoelectric, multiple-stage thermoelectric, or cryogenic apparatus of the type known in the art.

Figure 2:
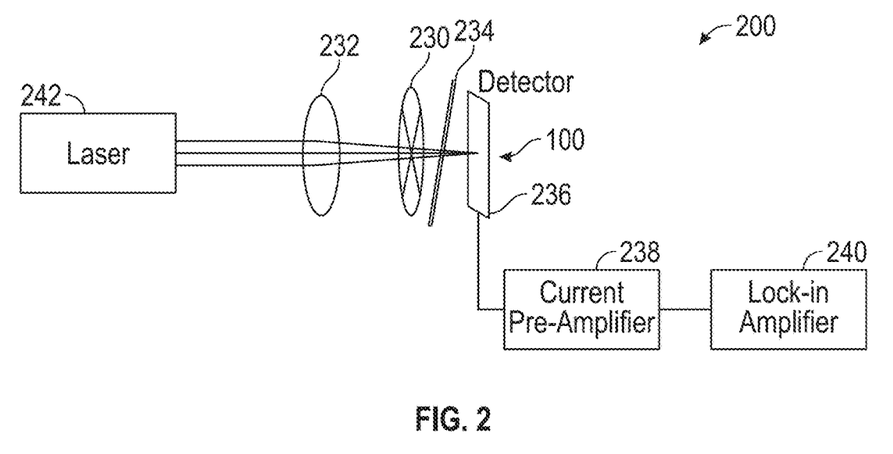
FIG. 2 is a high-level illustration of a laser detection system in accordance with an embodiment of the disclosure.

With reference to FIG. 2, there is depicted an example high-level illustration of a laser detection system 200 in accordance with an embodiment of the disclosure that utilizes the hybrid plasmonic-pyroelectric detector 100 shown in FIGS. 1A and 1B. The laser detection system 200 includes a mechanical chopper 230, a lens 232, a folding mirror 234, and a chip carrier 236. The detector chip 109 is mounted (e.g., bonded) to the chip carrier 236 (corresponding to chip carrier 103 in FIG. 1A). The hybrid plasmonic-pyroelectric detector 100 is electrically coupled via the contacts 120, 122 to a current pre-amplifier 238 and a lock-in amplifier 240 as shown. The lock-in amplifier 240 is an exemplary instantiation of phase-sensitive readout electronics and as will be appreciated by those skilled in the art, other implementations may be utilized. The focusing optics used to demonstrate the functionality of this system and as illustrated in this exemplary embodiment consist of a biconvex zinc selenide (ZnSe) lens that focuses coherent light at, for example, $\lambda=9$ µm, that generated by a laser 242 and directed onto the detector via the folding mirror 234. The laser radiation passes through the mechanical chopper 230 and onto the detector 100. The detector is mounted to the chip carrier 236, which in turn is inserted into a socket mounted on a printed circuit board (PCB). The PCB is step-scanned through the focal plane of the focusing lens. At each step location, the current pre-amplifier 238 converts current driven in the PCB to a voltage, which is then read out by the lock-in amplifier 240 phase locked to a frequency of the chopper 230. In this manner, the detector is operable in current mode, which provides superior detector performance by minimizing parasitic capacitance and other electromagnetic interference sources.

Figure 3:
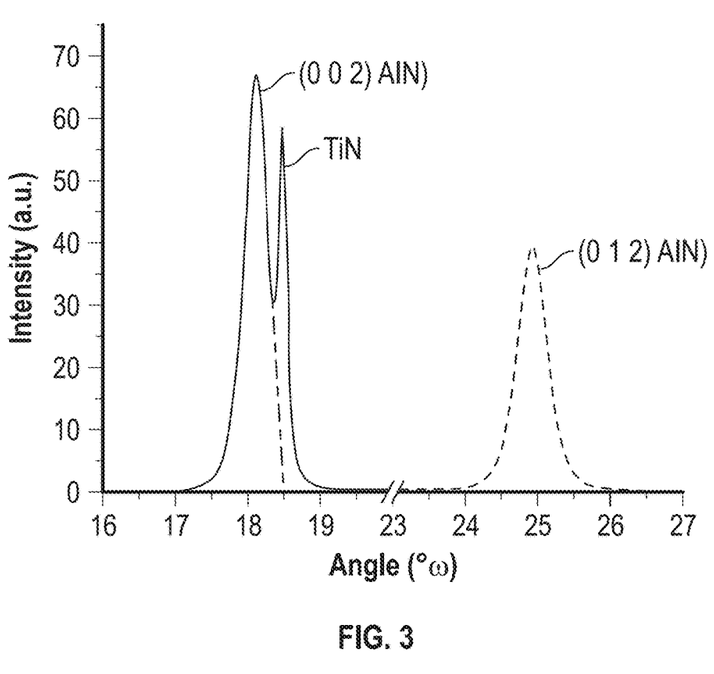
FIG. 3 is an X-ray diffraction plot showing the crystalline nature of the detector.

Referring now to FIG. 3, there is depicted an X-ray diffraction plot showing the crystalline nature of the detector attributable to the highly oriented nature of the pyroelectric material. The plot illustrates curves for intensity (a.u) vs. angle (° ω). The X-ray diffraction analysis indicates a significantly higher crystallinity than the materials utilized in pyroelectric detectors of the prior art. The full width at half maximum (FWHM) of the X-ray diffraction rocking curve for the TiN is 0.21°, while the AlN shows two distinct crystal facets. The (0 0 2) AlN orientation has a FWHM=0.411°, while the (0 1 2) orientation has a FWHM of 0.501°. Crystalline orientation between 0.1°-1° as measured by X-ray diffraction is obtainable using advanced sputtering processes such as that described above. The crystalline order of each crystal facet in the detector is therefore 3.33-fold and 2.73-fold, respectively, which is greater than known expedients.

Figure 4:
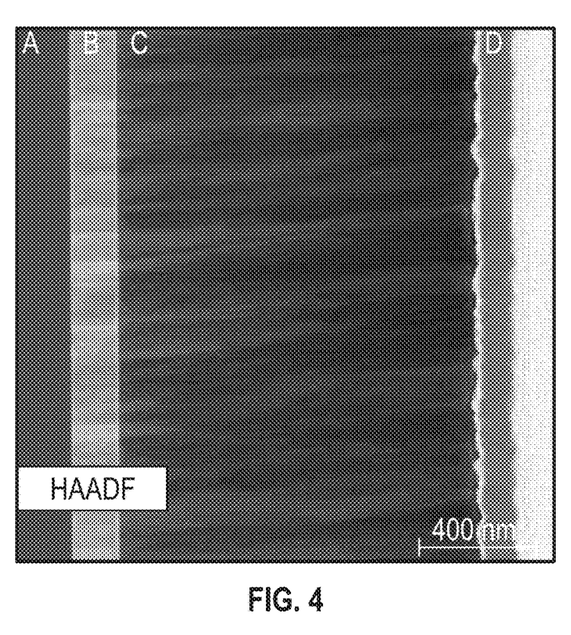
FIG. 4 is a cross-sectional image viewed through an electron microscope which illustrates the crystalline, uniform nature of the detector.

FIG. 4 is a cross-sectional image viewed through an electron microscope which illustrates the crystalline, uniform nature of the detector. The horizontal striations between layers B and C (TiN and AlN, respectively) depict the orientation of the two crystal facets in the detector. This image was taken at one of the electrode contacts, so no apertures in the gold layer (D) are visible. The significant increase in crystalline order as compared to the prior art (e.g., Ishii), allows for an increase in the performance of the detector due to the highly oriented spontaneous polarization that occurs in the pyroelectric layer. Advantageously, when such spontaneous polarization is highly oriented, a greater pyroelectric voltage will develop in the detector as a result of temperature changes.

Figure 5A:
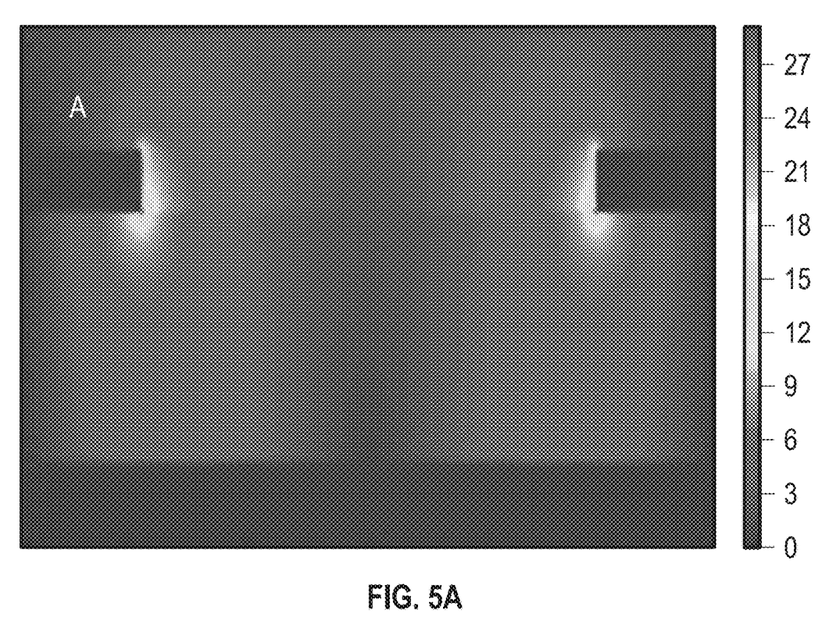
FIGS. 5A and 5B represent a finite element time domain simulation that depicts operation of the detector.
Figure 5B:
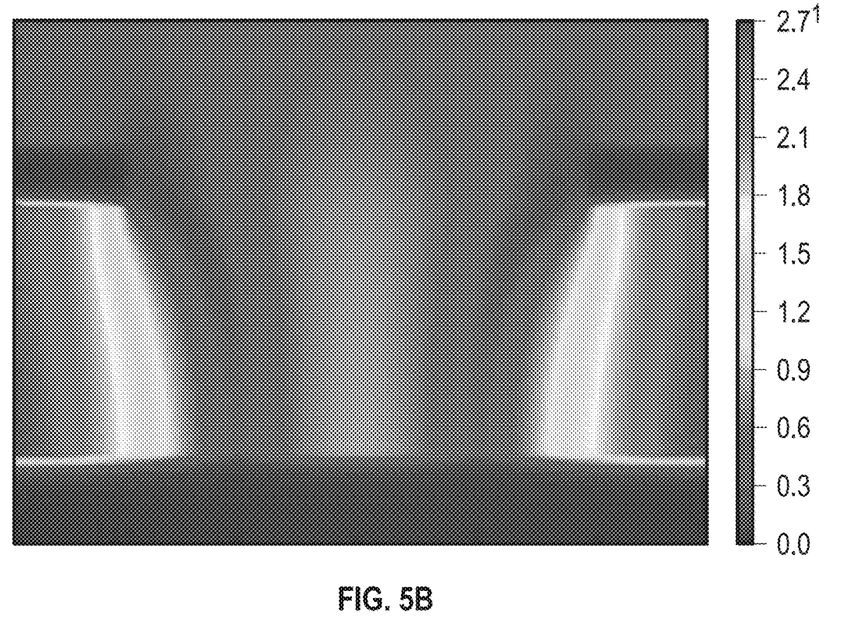

FIG. 5A and 5B represent a finite element time domain simulation that depicts operation of the detector 100. When an impedance-matched photon is incident on the detector 100, the light is coupled into a plasmonic cavity mode, where the bulk of the propagating plasmonic electric field is confined to the detector cavity. Unable to re-radiate into free space, the plasmonic cavity mode decays and evolves heat, which increases the spontaneous polarization of the AlN layer that functions as dielectric material filling the cavity. The resulting voltage is measured using the plasmonic (gold) aperture array 108 as one electrode, and the TiN ground plane 102 as the second electrode.

Figure 6:
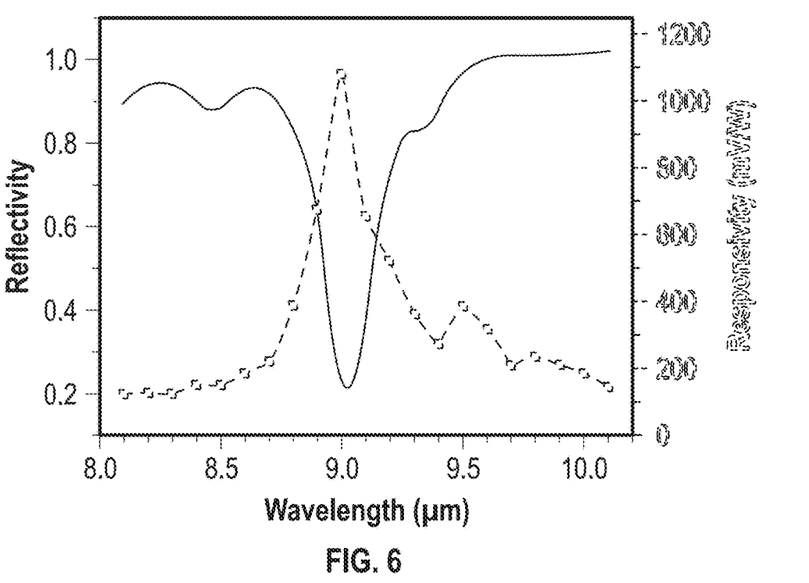
FIG. 6 shows the reflectivity and responsivity of the detector.

FIG. 6 shows the reflectivity and responsivity of the pyroelectric detector. In accordance with an exemplary embodiment, a detector 100 was designed to selectively detect a wavelength of λ=9 μm. The reflectivity minimum of 0.21 corresponds to a responsivity maximum of 1.08 V/W, with a spectral FWHM=0.332 μm. Although the wavelengths studied are slightly different, the maximum responsivity measured under pulsed laser irradiation in the prior art is 10 mV/W, compared to 1.08 V/W as provided by the embodiment in accordance with the disclosure. This is primarily attributed to the aluminum nitride, which is a superior pyroelectric material, both in terms of the pyroelectric effect and in crystalline orientation.

Figure 7:
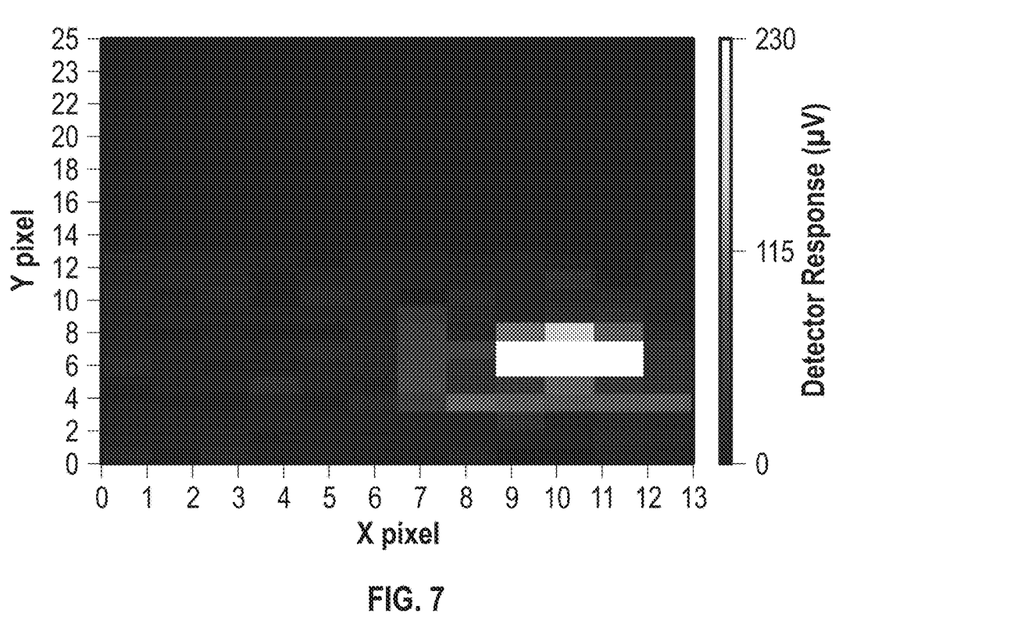
FIG. 7 is a plot of the detector response and detection of a high-power laser pulse.

FIG. 7 is a plot showing the detector response, specifically the ability of the detector 100 to selectively detect a high-power laser pulse. In a test application, the PCB of a laser detection system 200 was mounted to an (x,y) translation stage, which was scanned in steps throughout the focal plane of the collection lens. The entire output of a quantum cascade laser operating at λ=9 μm with a peak irradiance of 32.3 GW/cm$^2$, was focused directly onto the detector 100. An irradiance of such magnitude would easily damage currently commercially available pyroelectric detectors. The embodiment in accordance with the disclosure survived several hours of direct excitation at this irradiance, and with no damage. The white area of the plot depicted in FIG. 7 shows the spatial location of the focused laser beam. In the example shown, the pixel has an edge length of is 0.5 mm (500 μm). Decreasing the pixel size advantageously causes an improvement in spatial resolution at the same wavelength. The darker areas represent noise.

It will be appreciated that the devices, systems, and methods disclosed in accordance with embodiments of the disclosure are set forth by way of example and not of limitation. Absent an explicit indication to the contrary, the disclosed devices, systems, and method steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

It will be understood by those skilled in the art that various changes may be made in the form and details of the described embodiments resulting in equivalent embodiments that remain within the scope of the appended claims.

What is claimed:

1. A hybrid plasmonic-pyroelectric detector, comprising:
   a substrate;
   a refractory ground plane mounted on a surface of the substrate;
   a plasmonic array defining a plurality of apertures formed in the array,
   a highly oriented pyroelectric layer having a first side mounted on a surface of the ground plane and a second side mounted on a surface of the plasmonic array;
   an electrode contact coupled to the refractory ground plane;
   an electrode contact coupled to the plasmonic array; and
   where the detector is fabricated on one side of a back-thinned wafer or a thermally isolated wafer.

2. The hybrid plasmonic-pyroelectric detector of claim 1, where the substrate consists of sapphire, the refractory ground plane consists of titanium nitride, the pyroelectric layer consists of aluminum nitride, and the plasmonic array includes a gold layer and the plurality of apertures in the array are formed in the gold.

3. The hybrid plasmonic-pyroelectric detector of claim 1, where the plasmonic array is one of an ordered array and disordered array of apertures.

4. The hybrid plasmonic-pyroelectric detector of claim 1, further comprising a cooling apparatus, the cooling apparatus including one of a sterling, Joule-Thompson, single stage thermoelectric, multiple stage thermoelectric, and cryogenic apparatus.

5. The hybrid plasmonic-pyroelectric detector of claim 1, where the substrate consists of one of sapphire, silicon, glass, fused silica, quartz, silicon carbide, indium phosphide and gallium arsenide.

6. The hybrid plasmonic-pyroelectric detector of claim 1, where the refractory material consists of one of chrome, titanium, tungsten, titanium-tungsten, gold or molybdenum.

7. The hybrid plasmonic-pyroelectric detector of claim 1, where the pyroelectric material consists of one of leadzirconium-titanate, lead tantalate, aluminum nitride, tourmaline, gallium nitride and polyvinyl fluoride.

8. A hybrid plasmonic-pyroelectric detector, comprising:
a sapphire substrate;
a refractory ground plane mounted on a surface of the substrate;
a plasmonic array defining a plurality of apertures formed in the array,
a semiconductor having a first side mounted on a surface of the ground plane and a second side mounted on a surface of the plasmonic array;
an electrode contact coupled to the refractory ground plane; and
an electrode contact coupled to the plasmonic array.

9. The hybrid plasmonic-pyroelectric detector of claim 8, where the semiconductor consists of one of mercury-cadmium-telluride, indium gallium arsenide, indium arsenide, lead salt, quantum dot, lead sulfide, and silicon.

10. The hybrid plasmonic-pyroelectric detector of claim 8, where the substrate consists of sapphire, the refractory ground plane consists of titanium nitride, and the plasmonic array includes a gold layer and the plurality of apertures in the array are formed in the gold layer.

11. The hybrid plasmonic-pyroelectric detector of claim 8, further comprising a plurality of the hybrid plasmonic-pyroelectric detector elements constructed and arranged into one of an ordered array and a disordered array, with each detector element configured to sense a different wavelength.

12. A hybrid plasmonic-pyroelectric detector, comprising:
a sapphire substrate;
a refractory ground plane mounted on a surface of the substrate;
a plasmonic array defining a plurality of apertures formed in the array,
an avalanche material having a first side mounted on a surface of the ground plane and a second side mounted on a surface of the plasmonic array;
an electrode contact coupled to the refractory ground plane; and
an electrode contact coupled to the plasmonic array.

13. The hybrid-plasmonic-pyroelectric detector of claim 12, where the avalanche material is one of a photodiode and a photoconductive material.

14. The hybrid-plasmonic detector of claim 12, where the substrate consists of sapphire, the refractory ground plane consists of titanium nitride, and the plasmonic array includes a gold layer and the plurality of apertures are formed in the gold layer.

15. A laser detection system, comprising:
a mechanical chopper;
a lens;
a mirror;
a chip carrier having a hybrid plasmonic-pyroelectric detector mounted thereon, the hybrid plasmonic-pyroelectric detector comprising:
a substrate;
a refractory ground plane mounted on a surface of the substrate;
a plasmonic array defining a plurality of apertures formed in the array,
a highly oriented pyroelectric layer having a first side mounted on a surface of the ground plane and a second side mounted on a surface of the plasmonic array;
an electrode contact coupled to the refractory ground plane;
an electrode contact coupled to the plasmonic array; and
wherein the chip carrier is mounted to a printed circuit board, and the printed circuit board is mounted to a translation stage and electrically coupled to a current pre-amplifier and lock-in amplifier.

16. The laser detection system of claim 15, where the lens is a biconvex zinc selenide lens.

17. The laser detection system of claim 15, further comprising active pyroelectric detection.

18. The laser detection system of claim 15, where the plasmonic array is one of an ordered and disordered array of apertures formed in a gold layer.

19. The laser detection system of claim 15, where the detector is fabricated on one of a back-thinned and thermally isolated wafer.

20. The laser detection system of claim 15, further comprising a cooling apparatus, the cooling apparatus including one of a sterling, Joule-Thompson, single stage thermoelectric, multiple stage thermoelectric, and cryogenic apparatus.

21. The laser detection system of claim 15, where the substrate consists of one of sapphire, silicon, glass, silicon carbide, indium phosphide and gallium arsenide.

22. The laser detection system of claim 15, where the refractory material consists of one of chrome, gold, titanium, tungsten, titanium-tungsten or molybdenum.

23. The laser detection system of claim 15, where the pyroelectric material consists of one of lead-zirconium-titanate, lead tantalate, aluminum nitride, tourmaline, gallium nitride and polyvinyl fluoride.

* * * * *